(12) United States Patent
Fischman et al.

(10) Patent No.: US 12,555,403 B1
(45) Date of Patent: Feb. 17, 2026

(54) DETERMINING AND ANALYZING STRUCTURED ATTRIBUTE DATA FOR PHYSICAL SYSTEMS BASED ON A DIGITAL MAP

(71) Applicant: Vigilante Strategy LLC, Frisco, TX (US)

(72) Inventors: Michael Fischman, Frisco, TX (US); Justin Davis Wong, Plano, TX (US); Scott Michael Brandt, Dallas, TX (US)

(73) Assignee: Vigilante Strategy LLC, Frisco, TX (US)

( * ) Notice: Subject to any disclaimer, the term of this patent is extended or adjusted under 35 U.S.C. 154(b) by 0 days.

(21) Appl. No.: 19/048,172

(22) Filed: Feb. 7, 2025

(51) Int. Cl.
  *G06V 30/422* (2022.01)
  *G06T 7/73* (2017.01)
  *G06V 30/10* (2022.01)

(52) U.S. Cl.
  CPC .............. *G06V 30/422* (2022.01); *G06T 7/73* (2017.01); *G06V 30/10* (2022.01); *G06T 2207/20101* (2013.01)

(58) Field of Classification Search
  USPC ........................................................ 382/113
  See application file for complete search history.

(56) References Cited

U.S. PATENT DOCUMENTS

| | | | |
|---|---|---|---|
| 7,647,269 B2 | 1/2010 | Brett | |
| 9,202,180 B2 | 12/2015 | Denker et al. | |
| 9,239,992 B2 | 1/2016 | Valentino | |
| 9,792,368 B1* | 10/2017 | Amacker | H04W 4/02 |
| 9,978,096 B2 | 5/2018 | Gibson et al. | |
| 10,387,806 B2 | 8/2019 | Towfiq et al. | |
| 11,157,137 B2 | 10/2021 | Salles | |
| 2002/0120492 A1 | 8/2002 | Phillips et al. | |
| 2014/0347492 A1* | 11/2014 | Fales | H04N 23/11 |
| | | | 348/164 |
| 2015/0287119 A1 | 10/2015 | Bhan et al. | |
| 2016/0350680 A1 | 12/2016 | Sweeney et al. | |
| 2019/0213621 A1 | 7/2019 | Groetzinger et al. | |
| 2020/0380427 A1 | 12/2020 | Sunshine et al. | |
| 2021/0345347 A1* | 11/2021 | Hayford | G06Q 30/0282 |
| 2021/0381840 A1* | 12/2021 | Viswanathan | G09G 5/37 |
| 2022/0343395 A1* | 10/2022 | Luong | G06Q 30/0635 |
| 2023/0026762 A1 | 1/2023 | Crespo | |
| 2023/0108713 A1 | 4/2023 | Reed et al. | |

(Continued)

*Primary Examiner* — Ian L Lemieux
(74) *Attorney, Agent, or Firm* — Henry Patent Law Firm PLLC

(57) ABSTRACT

In a general aspect, structured attribute data for physical systems is generated based on a digital map. In some implementations, a system receives a digital map representing a physical system. The system performs a set of image processing operations using the digital map as input. The system determines a set of points representing points of interest within the physical system. The system determines a set of zones defined with respect to the digital map. The system calculates distances between the set of points and the set of zones. The system creates a structured dataset that includes entries for each zone in the set of zones, wherein each entry includes zone attributes corresponding to a respective zone in the set of zones. The system determines and outputs a ranking of the entries of the structured dataset based on a set of weights corresponding to zone attributes of the structured dataset.

28 Claims, 10 Drawing Sheets

(56) References Cited

U.S. PATENT DOCUMENTS

| | | | | |
|---|---|---|---|---|
| 2023/0394991 A1* | 12/2023 | Donato | .................. | G06V 20/70 |
| 2024/0362211 A1* | 10/2024 | Shutsa | .................. | G06F 16/252 |
| 2025/0322447 A1* | 10/2025 | Haldar | ................ | G06F 16/9038 |

* cited by examiner

DETERMINING AND ANALYZING STRUCTURED ATTRIBUTE DATA FOR PHYSICAL SYSTEMS BASED ON A DIGITAL MAP

BACKGROUND

The following description relates to determining and analyzing structured attribute data for physical systems based on a digital map.

Digital maps have been used to represent physical systems in a broad array of contexts such as event spaces (such as stadiums, arenas, concert halls, or outdoor concert venues), buildings (such as offices, shopping malls, or other businesses), and geographic areas (such as cities, regions, city blocks, parks, campuses, or neighborhoods). These digital maps can be used by visitors to those physical systems for various reasons, such as planning an itinerary or purchasing tickets for an event.

DETAILED DESCRIPTION

Figure 1:
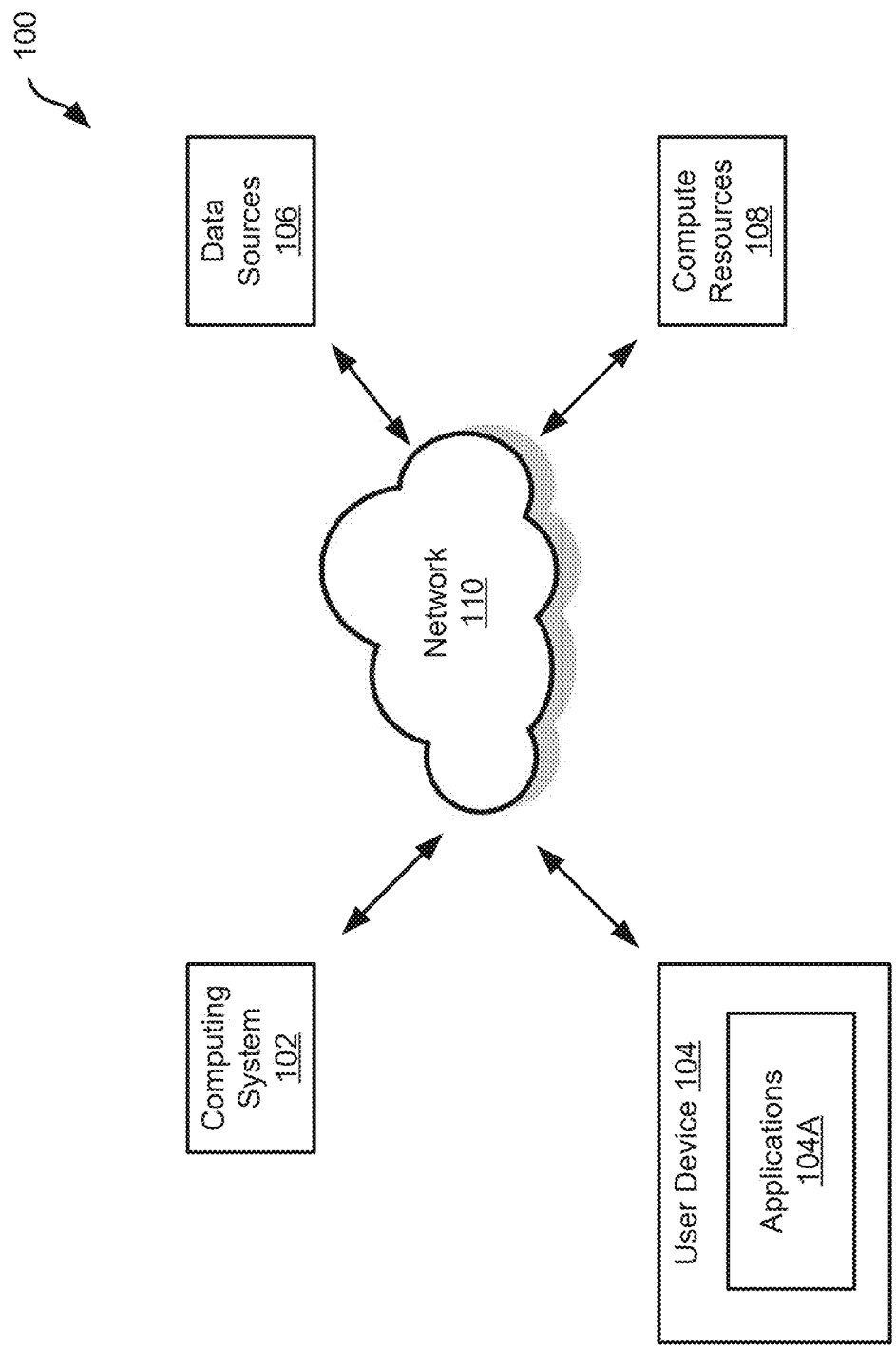
FIG. 1 is a block diagram showing aspects of an example computing environment.

In some aspects of what is described here, methods, systems, and computer-readable media are disclosed for processing digital maps for determining and analyzing structured attribute data for physical systems. In some examples, processing a digital map includes performing image processing operations on a digital map (e.g., a computer-readable graphical representation) representing a physical system (e.g., a physical layout for an integrated circuit, a wiring diagram for an electronic system, a drilling pattern for hydrocarbon production from a subterranean formation, a floorplan of a building a topographical map of a city, a network layout for a wide area communication network, etc.). For example, features and labels are determined using shape detection and text label detection. In some examples, processing the digital map includes performing a point of interest determination process. For example, one or more new or existing points of interest associated with the digital map are determined. In some examples, processing the digital map includes performing a zone determination process. For example, one or more zones (e.g., features, areas, rooms, sections, or buildings) represented in the digital map are determined. In some examples, processing the digital map includes performing a data ranking process. For example, the data ranking process can include accessing (e.g., creating, retrieving, or updating) a structured dataset that includes entries for each zone. In some examples, the structured dataset entries include attributes for respective zones. For example, attributes can be determined based on output of the image processing operations, distances calculated between points of interest and zones, external or retrieved attribute data, or some combination of one or more of these. In some examples, the data ranking process includes determining a ranking of the structured data along some dimension (e.g., one or more criteria defined with respect to one or more zone attribute). For example, by determining zone attributes for distinct areas of the digital map, these physical areas can be subject to quantitative analysis and comparison, for example, such as ranking. In some examples, the ranking is based on a set of weights. In some examples, a representation of the ranking is output. For example, the representation can be a visual overlay on the digital map or other visual representation.

Using the techniques described here can enable dynamic processing of digital map data to produce useful and actionable contextual data regarding a physical system. For example, generating and/or collecting quantified attribute data stored in a structured manner can enable subsequent processes to utilize such information to make informed or efficient decisions. For example, attribute data determined and analyzed according to the techniques herein can be used to determine foot traffic flow or demand for certain physical locations represented in the digital map, which can be used to intelligently implement measures or deploy infrastructure for responding to such conditions. For example, such information can be used to perform demand-spreading activity such as increasing or decreasing the desirability of certain zones in the digital map by adjusting attributes or other properties (e.g., adding or removing amenities, increasing or decreasing cost associated with the zone, or other changes). Using the techniques described herein can enable an operator to dynamically update or define locations of interest within the digital map (e.g., points of interest or zones), attributes, ranking weights, or any combination of the preceding. In some cases, one or more of the processes described herein can automatically detect changes in a digital map and consequently determine updated attributes. For example, a communication network diagram map can be updated when new components are added (e.g., when computing facilities are expanded) or a venue map can be updated when new sections are added (e.g., due to high demand), and the updated map can be processed to collect and analyze attribute data for the new components or sections. In some cases, certain zones can be isolated for analysis. For example, the processes described herein can enable analysis and ranking of fewer than all zones, rather than assessing the entire map. Additional and/or other benefits can be achieved in various implementations.

Example uses of the techniques described herein include: electronic circuit and circuit board design (e.g., a system can map components (e.g., CPU, memory, etc.), define zones, and rank locations based on factors like signal strength, proximity, and heat distribution to optimize design and performance); facility management (e.g., for large-scale facilities like malls, hospitals, airports, office spaces, and warehouses, a system can assist in ranking zones for patrons, employees, and operations, allowing optimization of resource allocation, traffic flow, and space usage); logistics and supply chain operations (e.g., a system can rank locations for suppliers, storage, and operational hubs allowing improvement in production efficiency and order fulfillment in warehouses or distribution centers); utility systems (e.g., for energy storage, communication networks, or data centers, a system can rank zones based on factors like proximity to users, resource utilization, or capacity to optimize network or infrastructure performance); agriculture and land use mapping (e.g., a system can map fields, define crop zones, and rank them based on factors such as soil quality, irrigation efficiency, and crop yield to maximize farming productivity and resource allocation); environmental resource allocation (e.g., a system can be used to prioritize conservation zones, wildlife habitats, or protected areas based on environmental importance, urgency, or ecological impact, aiding in resource allocation for environmental protection); disaster and emergency response (e.g., a system can rank zones based on factors like damage levels, population density, and availability of resources to help prioritize response efforts and allocate emergency resources); security systems (e.g., a system can be applied in security, surveillance, or defense systems by ranking zones based on security threats, vulnerabilities, or proximity to high-risk areas, ensuring efficient resource allocation and prioritization).

The structured datasets, including the entries for each zone and the rankings of those entries, can provide technical improvements and advantages for various applications, for example, to solve various technical problems. For instance, structured datasets generated from a collection of digital maps can be processed by artificial intelligence systems (e.g., neural networks or other types of models) to identify patterns and extract knowledge from the collection of digital maps. As an example, maps of different physical layouts can be processed to identify patterns associated with optimal layouts or other measures of interest. The techniques described here can be used to pre-process data for consumption by artificial intelligence systems or other advanced computing systems that are computationally expensive. Such pre-processing can be useful, for example, to provide a structured or standardized representation of disparate data types from varied sources. The structured data sets may also have a smaller memory profile than the original data maps, allowing the datasets to be stored, processed, and communicated more efficiently in a distributed computing environment. For instance, many artificial intelligence systems leverage an array of geographically distributed physical computing resources. Accordingly, the processes and techniques described here can provide a solution to technical problems, for example, problems related to storing and processing large and disparate datasets.

FIG. 1 is a block diagram showing aspects of an example computing environment. The example computing environment 100 shown in FIG. 1 includes computing system 102, user device 104 (including applications 104A), data sources 106, compute resources 108, and network 110. For example, one or more of the elements shown in FIG. 1 communicate with each other over network 110, which can encompass one or more networks (e.g., local area networks, wide area networks, the Internet, or other techniques for communication between computer systems). The computing system 102, user device 104, data sources 106, and compute resources 108 can perform one or more portions of a process, or communicate with such process, for determining and analyzing structured attribute data for physical systems based on a digital map. Computing environment 100 may include additional elements than what is shown in FIG. 1. Computing environment 100 may include fewer elements than what is shown in FIG. 1. Computing environment 100 may include different elements than what is shown in FIG. 1. In some implementations, the elements of computing environment 100 may be configured to operate as described with respect to FIG. 1 or in another manner.

In some implementations, computing system 102 is a computing system of an entity or user that manages or performs processing of digital map data, in accordance with the techniques described here. For example, application 104A running on user device 104 can transmit a request via network 110 to computing system 102 to process a digital map and provide output based on attribute data of the map. In some cases, user device 104 provides an indication or copy of the particular digital map, points of interest, zone definitions or boundaries, other data for computing system 102 to use when processing the digital map, or any combination of the preceding. In some implementations, a user of computing system 102 (e.g., which may itself be a user device) requests processing of a digital map directly on computing system 102. In some implementations, user device 104 performs or manages (e.g., coordinates or instructions other resources to perform) processing of the digital map.

In some implementations, computing system 102 can utilize one or more external resources for processing a digital map to determine and analyze structured attribute data for physical systems based on the digital map. In some implementations, one or more data sources 106 can be used to retrieve additional data not included in the digital map. For example, previously extracted or determined attributes, contextual information regarding a digital map or features depicted therein, existing databases of structured attribute data, other data that can be used when processing the digital map, or any combination of the preceding. In some implementations, one or more compute resources 108 can be used to perform some or all computations or data processing involved in the processing of the digital map data. For example, third-party processing resources or services (of a different entity than of computing system 102) can be used to perform image processing operations for determining features depicted in a digital map.

The computing system 102, user device 104 (including applications 104A), data sources 106, and compute resources 108 are each implemented by one or more computer systems that have computational resources (e.g., hardware, software, and/or firmware) that are used to communicate with each other and to perform other operations. For example, each computer system may be implemented as an example computer system (e.g., computer system 800 of FIG. 8), or components thereof, for performing operations as described or illustrated with respect to FIG. 2, FIG. 3, FIG. 4, FIGS. 5A-5B, FIGS. 6A-6B, FIG. 7, or any combination or subcombination thereof. In some implementations, the computer systems, devices, and resources in computing environment 100 can be implemented in various types of devices, such as, for example, laptops, desktops, workstations, smartphones, tablets, sensors, routers, mobile devices, Internet of Things (IoT) devices, servers, other types of devices, or any combination of the preceding. Aspects of the computing environment 100 can be deployed on private computing resources (e.g., private enterprise servers, etc.), cloud-based computing resources, or a combination thereof.

Figure 2:
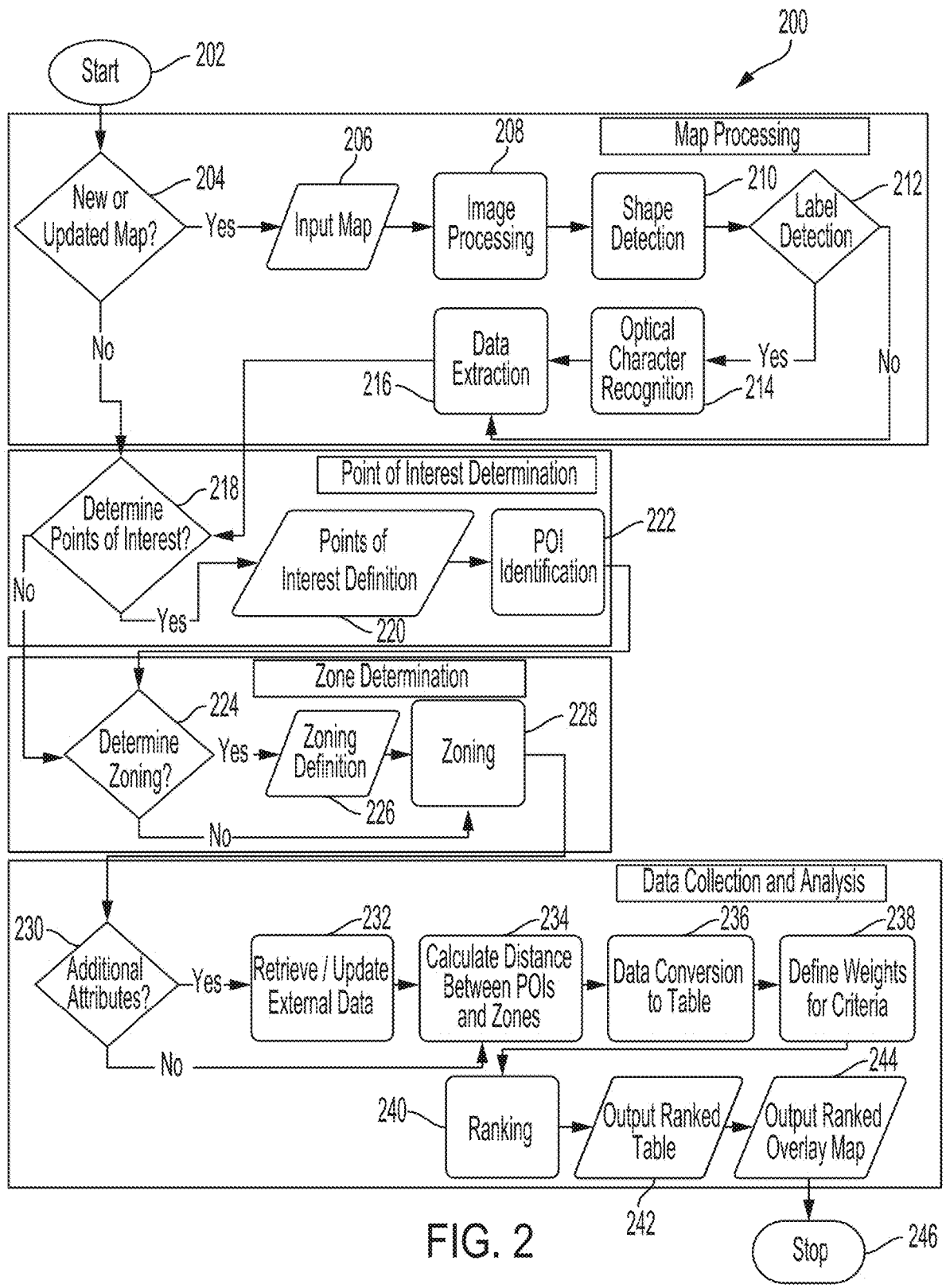
FIG. 2 illustrates a flowchart of an example process for determining and analyzing structured attribute data for physical systems based on a digital map.

FIG. 2 illustrates a flowchart of an example process for determining and analyzing structured attribute data for physical systems based on a digital map. The example process 200 of FIG. 2 can be used to process digital map data (e.g., the digital map, data derived from the digital map, data corresponding to the digital map, or any combination thereof). As illustrated in FIG. 2, process 200 includes a map processing sub-process, a point of interest determination sub-process, a zoning determination sub-process, and a data collection and analysis sub-process. In some implementations, one or more of these sub-processes can be performed separately from each other (e.g., as standalone processes performed by different computer systems or as processes that do not require performance of the other sub-processes). In some implementations, process 200 includes fewer than all of the sub-processes described here, or includes additional operations or processes. In some implementations, process 200 (or any sub-process thereof) is performed by one or more computer systems, devices, apparatus, or resources described here, for example, such as computing system 100 or computer system 800. At 202, process 200 starts.

Blocks 204 to 216 represent a map processing sub-process. At 204, a check is performed for a new or updated digital map. If a new or updated map is needed (or detected), process 200 proceeds to 206. At 206, input of the digital map is received. For example, the digital map can be provided as a file (e.g., an image file) or a pointer to location (e.g., a URL). In some implementations, the digital map can be any suitable image file type (e.g., JPEG, PNG, GIF, TIFF, BMP, WebP, HEIF, HEIC, a vector image format, SVC, EPS, HDR, a 3D image format, or other format). If a new or updated map is not needed (or detected), process 200 proceeds to 218. In some implementations, input of a digital map occurs before block 204 such that the check performed at block 204 includes determining whether the digital map received as input represents a new or updated digital map (e.g., does the input map differ from a previous version?); if the input map is new or updated, process 200 proceeds to 208. In some implementations, block 204 is omitted (e.g., an input digital map is processed without regard to whether it is new or updated).

In some implementations, the digital map represents a physical system. Examples of physical systems can include devices, components, computer systems, network systems, geographic areas (such as parks, neighborhoods, cites, regions), geographic features (e.g., natural resources), sites, buildings, or any combination thereof. Examples of digital maps can include depictions of the physical layout of components or systems (e.g., electronics device components, electronic circuit boards, computer systems, device footprints, device housings, wiring diagrams, network diagrams, etc.), physical resource maps (e.g., indicating location of natural or infrastructure resources), floorplans, seating configurations, section maps, three-dimensional renderings, or other graphical representations. In many cases, a particular physical system (or other physical area such as a park) can be the subject of several custom mapping scenarios. For example, the digital map relevant to an event can be unique or can depend on the type of event being held in the physical system. For instance, a seating configuration for a particular venue will be different for a concert than for a basketball game at the venue; the concert may even use a different seating configuration than another concert at the same venue. Likewise, these custom mapping scenarios can apply to different festivals held in the same park. Using custom or even unique digital maps as input, attributes for the physical system can be dynamically determined and subsequently analyzed.

At 208, a set of image processing operations is initiated. For example, at 208 image preprocessing can be performed on the digital map. In some implementations, preprocessing includes applying thresholding or edge detection to enhance the visibility of shapes depicted in the digital map representing different regions, segments, or sections. At 210, shape detection is performed on the digital map. For example, one or more shapes are detected within the processed digital map, where such shapes can represent features such as sections, territories, regions, buildings, or other physical areas in the physical system represented by the map. In some implementations, the coordinates and dimensions of these shapes are recorded. At 212, a check is performed to determine whether to perform label detection on the digital map. For example, a decision is made regarding whether the digital map includes text labels (e.g., associated with shapes or features). If labels are present, process 200 proceeds to 214; if not, process 200 proceeds to 216. At 214, optical character recognition is performed. For example, optical character recognition (or other text recognition technique) is used to extract text labels from the digital map. In some implementations, these labels provide identifiers for regions defined by detected shapes, which are stored as attribute data or otherwise associated with the digital map. At 216, data extraction is performed. For example, attributes are extracted, such as the location, size, and any labels (if available) for detected shapes. In some implementations, these attributes are stored in a structured format for further analysis. For example, these attribute be subsequently be considered zone attributes (or otherwise be used to determine zone attributes). In some implementations, postprocessing is performed using the attribute data, such as for formatting or normalizing the data or for deriving additional attribute data.

Blocks 218 to 222 represent a point of interest determination sub-process. For example, a set of points of interest can serve as reference points for determining attributes of areas (e.g., zones) within the digital map. In some examples, a point of interest represents a location (or area) of the digital map that is likely to be a focal point in the physical system. For instance, the point of interest can be a location that a visitor would want to view (e.g., a stage for a concert) or visit (e.g., an amenity such as a vendor or restroom). At 218, a check is performed to determine whether point of interest (POI) selection should be performed. For example, a determination is made regarding whether to use a previously defined set of points of interest for analysis of the digital map; if previously used POIs are used, POI selection can be skipped. If point of interest selection should be performed, process 200 proceeds to 220. Blocks 220 and 222 relate to selecting a set of points of interest. At block 220, user input representing selection of the set of points of interest is received. For example, the user input can be selection of locations on a displayed representation of the digital map displayed on the user's device (e.g., selected using mouse clicks or touch input selection). At 222, the set of points of interest are determined with respect to the digital map. For example, a computer system identifies digital map coordinates (or other data) representing the POIs as defined by the user input.

In some implementations, a set of points of interest is selected automatically (e.g., at one or both of either 220 or 222) based on the digital map (e.g., output of the image processing). For example, features and any text labels can be analyzed to identify locations in the digital map that are candidates to be points of interest. As an example, a geometric shape labeled "stage" in a venue map or a building labeled "museum" in a city map are likely points of interest for visitors to those respective physical areas. In some implementations, point of interest analysis is performed by one or more machine learning (ML) or artificial intelligence (AI) algorithms. In some embodiments, point of interest selection is performed by comparing detected labels to a set of categories or an ontology defining labels associated with likely points of interest. In some implementations, process 200 includes receiving user input representing selection, approval of, rejection of, or modifications to automatically detected points of interest. If a point of interest selection process should not be performed, process 200 proceeds to 224. For example, point of interest selection can be skipped if a set of points of interest is already defined and there is no indication that such set needs to be updated (e.g., no user input indication received or the digital map has not changed since a previous set of POIs was defined).

Blocks 224 to 228 represent a zone determination sub-process. For example, a set of zones can serve as reference points for determining attributes within the digital map. In some examples, a zone represents a location (or area) of the digital map whose attributes are to be quantified for analysis and comparison. For instance, a zone can represent a location that a visitor can occupy, travel through, or purchase rights to (e.g., a ticket). As such, comparison between zones (e.g., ranking) can be useful for quantifying demand for different portions of the physical system within the digital map. At 224, a check is performed to determine whether zone definition should be performed. For example, the computer system determines whether defining zones is required to segment the map into defined areas or sections. As an example, a determination is made regarding whether to use a previously defined set of zones for the analysis process. If zone definition should be performed, process 200 proceeds to 226.

Blocks 226 and 228 relate to defining a set of zones represented in the digital map. At block 226, one or more zoning definitions for the set of zones is determined. In some implementations, determining zoning definitions includes determining zoning boundaries, zoning criteria, or both. In some implementations, some or all of the zoning definition determination is automated. For example, zones can be automatically defined using one or more ML algorithms that analyzes detected features, text labels, other factors, or some combination of any of the preceding elements. In some implementations, some or all of the zoning definition determination is based on user input. For example, this can involve receiving user input representing manual zone creation. As an example, the user input can be selection of one or more locations, areas, features, or shapes of the digital map displayed on the user's device (e.g., selected using mouse clicks or touch input selection). In some implementations, the user input indicates boundaries (e.g., borders) of a zone. For example, the user input can define the zone boundaries by drawing or selecting lines on the digital map or otherwise indicating coordinates defining a shape with respect to the digital map. In some implementations, the user input indicates zoning criteria used for defining zones. For example, the zoning criteria can specify rules, principles, or preferences for determining zones. As an example, such zoning criteria can set a maximum size for a zone (e.g., by area, width, height, or otherwise), indicate whether specified types of detected labels of features should (or should not be) grouped, indicate whether specified types of labels or features should (or should not) be considered a standalone zone, other criteria. The zoning criteria can be used to guide automated zoning determination.

In some implementations, one or more areas of a digital map may be depicted without closed or defined borders. For example, an area can include two text labels indicating the area should be split into two zones, however a visible border between two areas is not defined in the map. In some implementations, a border is automatically determined. For example, automatic determination can incorporate contextual evidence from the map (e.g., other features, context of the label, etc.) to determine the border, can rely on (e.g., request) user input to define or confirm a border, can rely on a default or arbitrary definition of a border between zones, or a combination thereof.

In some implementations, each zone can represent a space within the physical system (e.g., environment) represented by the digital map, the space encompassing locations that share a set of characteristics or reason for logically being grouped within the same zone. For example, a seating section in a sports stadium includes multiple individual seats; these seats can be logically grouped together as a single zone due to the similarity in characteristics and amenities available to patrons located in those seats. As another example, a city block can be grouped logically as a zone (even if it includes multiple buildings). As yet another example, different floors of a building can be grouped logically as different zones. In some implementations, a zone represents a group of zones (e.g., sub-zones). For example, each seat can be a zone, but a section of seats is also considered a zone; at the analysis stage, seats of the same section are treated (e.g., ranked) as a single zone representing the section. In such example, structured data entries can be maintained for each seat in a section, but at the ranking phase each seat is grouped as a section for the purpose of at least some attributes.

In some implementations, a set of zones is determined automatically based on the digital map (e.g., output of the image processing). For example, features and any text labels can be analyzed to identify locations in the digital map that should be considered a zone that will be associated with structured data. As an example, a geometric shape labeled "section" or "viewing area" in a venue map or a building labeled "hotel" in a city map are candidate zones because, for example, visitors to those respective physical systems may select these areas (represented as zones) as a reference location for accessing the points of interest. For example, an example of a zone can be a viewing area for viewing the point of interest (e.g., if it's a stage) or lodging for staying when traveling to the point of interest (e.g., if it's a museum). In some implementations, zone definition is performed by one or more machine learning (ML) or artificial intelligence (AI) algorithms. In some embodiments, zone definition is performed by comparing detected labels to a set of categories or an ontology defining labels associated with likely zones. In some implementations, process 200 includes receiving user input representing selection, approval of, rejection of, or modifications to automatically detected zones.

In some implementations, a label overlaps an edge of a geometric shape or feature. In some implementations, a determination is made based on the context of the overlap or features of the map regarding how to associate the overlapping label with the geometric shape or feature.

In some implementations, a label is coded (e.g., is a symbol, is a color coded label, a pattern, etc.) and the digital map includes a legend for decoding the label. In such implementations, the legend can be used to decode the symbol.

If a zone definition process should not be performed, process 200 proceeds to 228. For example, zone definition can be skipped if a set of zones is already defined and there is no indication that such set needs to be updated (e.g., no user input indication received or the digital map has not changed since a previous set of zones was defined).

At 228, the zones are determined with respect to the digital map. For example, a computer system identifies digital map coordinates (or other data) representing the set of zones as defined by the zoning definition(s) (e.g., criteria, boundaries, or otherwise using an ML algorithm). The zoning definitions can be determined based on output of an automated determination (e.g., ML algorithm), user input, or can be accessed from existing data (e.g., stored configurations previously defined by user input or by previous processing of the digital map). For example, if zone definition at 226 is skipped because the decision at 224 is no (e.g., due to existing zone definitions that should be reused), the process retrieves the existing zone definitions from storage. In some implementations, block 226 is optionally omitted or combined with block 228 (e.g., the ML algorithm automatically determines zone definitions and corresponding coordinates within the map).

Blocks 230 to 244 represent a data collection and analysis sub-process. For example, data corresponding to the digital map can be processed and arranged in a structured data format that is used for analysis (e.g., ranking). Such data can include the digital map, metadata, output of image processing operations, points of interest, zones, zone attributes (e.g., determined or retrieved), other data, or a combination of any number of the preceding. In some implementations, the structured data format is a table that includes entries (e.g., rows) for each zone. In some implementations, each entry is associated with one or more zone attributes (e.g., columns). In some implementations, zone attributes for a zone include a zone identifier (e.g., a unique identifier or name of the zone), label(s) associated with the zone (e.g., corresponding to categories or characteristics of the zone), location coordinate(s) of the zone, distance(s) between the zone and POI(s), cost associated with the zone (e.g., ticket cost, hotel room cost, access or usage cost, average cost, lowest cost, or highest cost), elevation of the zone, temperature (e.g., average or expected) of the zone, directional orientation of the zone (e.g., direction of seats within the zone), other attributes, or a combination of any number of the preceding. For example, a label associated with a zone can identify a type of seating in the zone, a hotel star rating, existence of a particular amenity, whether the zone is shaded, whether the zone is grass or paved, whether the zone is located on a sideline of the field, whether the zone is located along a goal/basket/endzone side, whether the zone is located on a home team side, whether the zone is located on visitor side, whether the zone is noted as handicap accessible, whether the zone is standing room only, amenity access for the zone, or another category or characteristic.

At 230, a check is performed to determine whether to consider additional attributes in the data collection and analysis sub-process. For example, additional attributes can be attributes determined from the digital map (e.g., reflected in metadata, output of image processing, or other data) or one or more external data systems through API connections (e.g., a database or service that includes data related to the digital map, the physical system represented by the digital map, an event occurring at the physical system, or other data). If a determination is made to consider additional attribute data, process 200 proceeds to 232. At 232, additional attribute data is retrieved (e.g., from local or remote storage). For example, if additional attributes are required, process 200 retrieves this data from external sources (e.g., databases or other associated tables) via one or more APIs; this data is then integrated with any existing attribute data (e.g., of zones, groups of zones, features, or the digital map). In some implementations, the additional attributes are determined based on data retrieved for external data sources (e.g., additional attributes are derived by applying data processing to retrieved data). If a determination is made to not consider additional attribute data, process 200 proceeds to 234.

At 234, a distance is calculated between the points of interest and the zones. For example, for each (or some) of the points in the set of POIs, a corresponding distance from the point to each (or some) of the zones in the set of zones is determined. In some implementations, the distance represents a proximity to the center, an edge, or a specific feature within each zone. For example, the distance to a point of interest from a particular zone is quantified and saved as a zone attribute of the particular zone. This can be repeated for the particular zone for each POI (if there are multiple). Likewise, this can be repeated for each zone with respect to each of the POIs. This distance data can be used, in combination with other attribute data, to quantify physical system demand or traffic. In some implementations, the distance calculation is based on multiple distances. For example, the distance can be a value representing a weighted or average of multiple distances such as proximity to the center, edges, or specific features within each zone.

At 236, zone attribute data is converted into a tabular format. For example, zone attribute data extracted, determined, retrieved, collected, or otherwise available to process 200 is stored as a structured dataset in a table (or another format). For example, the table can include columns for a zone identifier (ID), a zone label, zone coordinates, zone size, distance(s) between the zone and POI(s), any additional attributes, or some combination of any of the preceding. For example, the table can include entries (e.g., rows) representing each zone (or a group of zones) of the set of zones determined by the zoning determination sub-process. In some implementations, converting attribute data into tabular form includes processing the data (e.g., formatting, normalizing, or other operations).

At 238, a set of weights corresponding to ranking criteria are defined. For example, the set of weights can be determined automatically (e.g., calculated or retrieved from storage) or received (e.g., specified via user input). In some implementations, ranking criteria are defined. For example, the ranking criteria can be determined automatically (e.g., calculated or retrieved from storage) or received (e.g., specified via user input). For example, ranking criteria can specify one or more criterion used to rank entries of the structured dataset, and the set of weights can specify how much influence each criterion has on the final ranking. In some implementations, the set of weights are defined based on user input. In some examples, user input can be received that specifies how to weight the ranking criteria. In some implementations, ranking criteria (e.g., one or more ranking criterion) can correspond to one or more attributes (e.g., columns in the table). For example, example ranking criteria can specify that entries should be ranked based on a first attribute and a second attribute, and an example set of weights can specify that the first attribute has a 60% weight and the second attribute has a 40% weight (e.g., the first attribute has a 50% higher effect on the result than the second attribute). In this example, the first attribute can be distance between a first zone and a first point of interest that represents a venue stage, and the second attribute can be a distance between the first zone a second point of interest that represents a wheelchair ramp in the venue. This example set of weights can be used to determine a quantified ranking of zones of the digital map, where the output reflects a higher preference for being closer to the stage but not at the expense of being a great distance from a usable wheelchair ramp. In some implementations, ranking criteria can specify any number of attributes (e.g., one, two, three, etc.). In some implementations, the set of weights can specify any number of weights (e.g., one, two, three, etc.).

In some implementations, ranking criteria, weights, or both (or other user defined preferences for ranking) are defined as structured data. In some implementations, this structured data is accessed and used for performing ranking. For example, structured data that specifies the ranking criteria and weights can be updated. In some implementations, the update causes re-reranking to occur (e.g., triggers re-ranking or reprocessing of digital map data). In some implementations, the updated ranking criteria and weights are used the next time processing and ranking of the attributed data is performed. In some implementations, the ranking criteria, weights, or both, are stored as part of the structured dataset (e.g., that includes attribute data) that is associated with a digital map.

At 240, ranking is performed. In some implementations, entries in the data set are ranked according to their corresponding attribute data. For example, the set of weights are applied to the ranking criteria to determine such ranking. In an example in which each entry represents a respective zone of the digital map, the entries are ranked based on defined ranking criteria, which may include the calculated distances between the POI(s), additional attributes, or other permutations of data derived from these attributes. In some cases, the ranking process can be customized for different users and dynamically performed. In this way, multiple different scenarios can be modeled. For example, actionable data regarding demographics and flow of demand (e.g., foot or vehicle traffic) within the physical system can be determined and addressed based on a variety of factors such as the physical system, amenities, event footprint, and others. In some implementations, a user can utilize the ranking output to determine physical locations (zones) that meet the user's specific needs (e.g., expressed in the ranking criteria and weights). This can reduce the physical burden on the user upon arrival at the physical system represented by the digital map.

In some implementations, ranking includes ranking each entry according to each weighted criterion of the ranking criteria. For example, a set of weights may specify three weights for three different criteria. As a result, the structured data can be considered along three separate rankings (e.g., ordered three separate times, each time ordering the entries according to a different respective criteria). In some implementations, each entry is already associated with a rank for the particular criteria (e.g., zone attribute data indicates a zone is the first closest or second closest to a POI). If rank for the particular criteria exits, it can be retrieved from the structured data for analysis (e.g., for applying weights and determining a composite ranking). In some implementations, a rank is determined for each of the three separate orderings, and a composite ranking for each entry is determined based on its individual rank in each ordering and corresponding weight. For example, the set of three weights may include weights of 50%, 30%, and 20% for respective criteria in a set of three different criteria. When ordered according to each of these criteria, a first entry can have respective ranks of 1, 4, and 3. Applying the weights to these ranks leads to a composite score of 2.3 (e.g., 0.5*1+0.3*4+0.2*3=2.3). In this example, a second entry has respective scores of 2, 7, and 9, which leads to a composite score of 4.9 (e.g., 0.5*2+0.3*7+0.2*9=4.9). In this example, the first entry with a composite score of 2.3 would rank higher than the second entry with composite score of 4.9 (e.g., the first entry represents a better balance of the weighted criteria provided). In some implementations, other techniques for determining a composite of weighted rankings according to multiple ranking criteria can be used.

At 242, output of the ranking is performed. For example, process 200 can output a representation of the ranking. In some implementations, the representation includes a rank-ordered version of the structured dataset. For example, a rank-ordered table can be stored in memory.

At 244, visual output of the ranking is performed. For example, process 200 can output a visual representation of the ranking. For example, the visual representation can be a version of the digital map (e.g., that includes markings, colorings, or other visual indicators of the ranking). For example, the visual representation can be a visual overlay displayed with the visual map (e.g., an application, such as a web browser, displays visual indicators overlaid on the digital map). At 246, process 200 ends.

In some implementations, process 200 can be performed again on a digital map. In some implementations, process 200 (and one or more of the sub-processes therein) can determine whether to perform one or more operations on the digital map, or whether doing so is not necessary. For example, processing (e.g., re-ranking) can be performed in response to the digital map being changed, attribute data associated with the map being changed, user preferences (e.g., ranking criteria or weights) being updated, or another trigger. For example, a determination is made that the digital map has no changes (e.g., relative to a previously processed version, based on metadata), so image processing of the digital map is not performed. Likewise, some or all of an existing structured dataset can be reused or updated for subsequent analysis or storage. In some implementations, determining whether to perform one or more operations (e.g., sub-processes) depends on whether reuse criteria for those operations is satisfied. In some implementations, reuse criteria (e.g., one or more criterion) is based on data changes (e.g., whether the digital map has changed, retrieved attributes or metadata indicates changes to an event, or other changes reflected in data that is retrieved or determined). In some implementations, reuse criteria is based on time (e.g., whether a length of time has passed since the operations were previously performed). In some implementations, reuse criteria is based on user input (e.g., whether user input indicates new POIs or zone definitions should be determined or provided). In some implementations, reuse criteria is based on some combination of any number of the above.

Note that in the example of process 200, the blocks can be performed in different orders than illustrated or described here, can be combined, some blocks can be omitted, and additional blocks can be performed. Such variations are considered within the scope of this disclosure.

Figure 3:
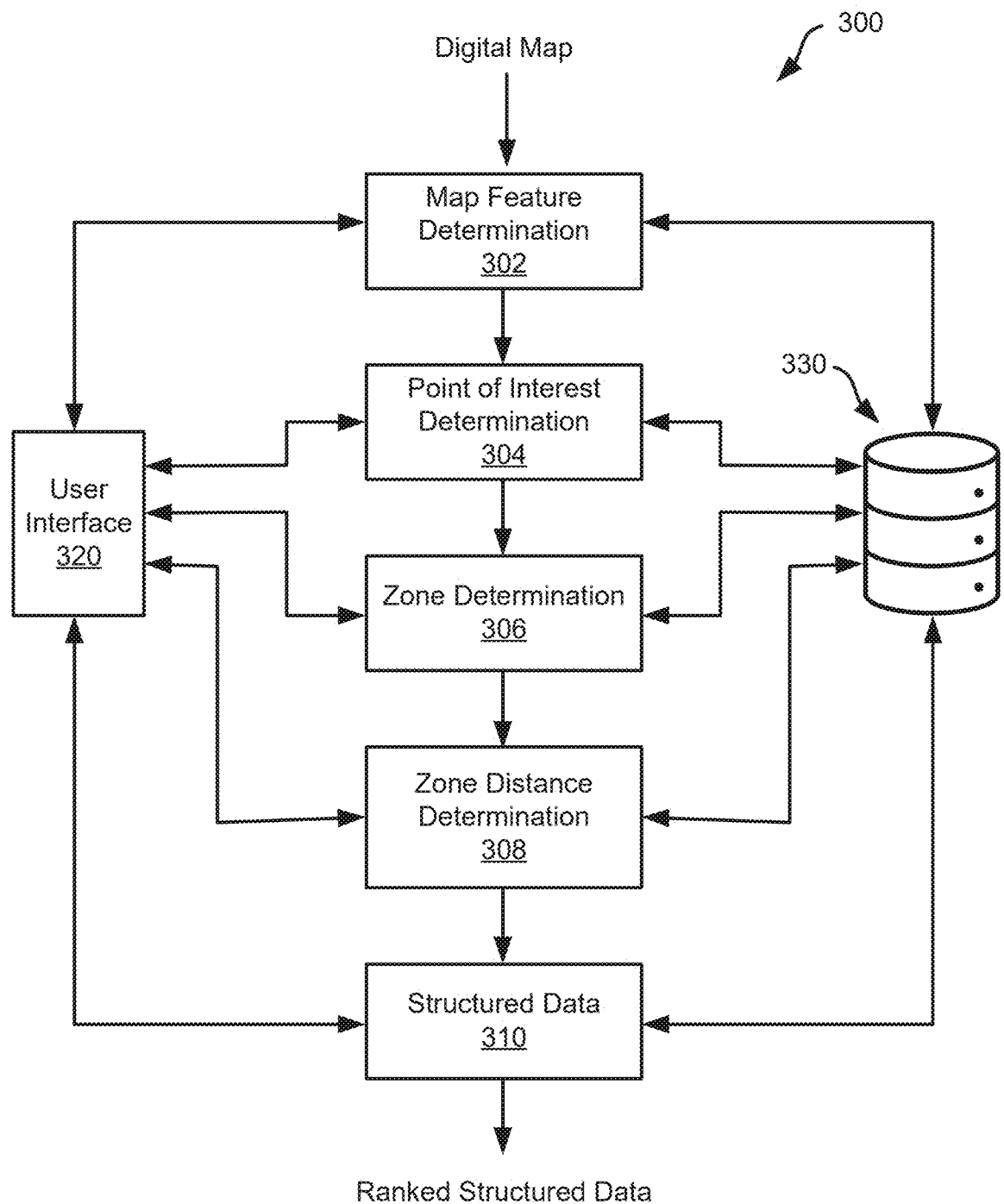
FIG. 3. Illustrates a block diagram of example modules used for determining and analyzing structured attribute data for physical systems based on a digital map.

FIG. 3. Illustrates a block diagram of example modules used for determining and analyzing structured attribute data for physical systems based on a digital map. Diagram 300 illustrates a logical arrangement of the example modules and data pathways between such modules for processing map data. Diagram 300 includes a map feature determination module 302, point of interest determination module 304, zone determination module 306, zone distance determination module 308, and structured data module 310. Also illustrated in diagram 300 is user interface module 320 and database 330. The modules depicted in FIG. 3 can represent software components (e.g., one or more application) or hardware components (or a combination of software and hardware components) used to perform the operations of each module. The particular software or hardware components used to implement each module can be the same or different. For example, the map feature determination module can be implemented at least in part by remote computing resources whereas zone determination is implemented locally on a computer system of the user.

The modules illustrated in FIG. 3 can be used to perform the processes (e.g., process 200, process 700, or any sub-process or operation thereof) described here. For example, map feature determination module 302 can perform the image processing sub-process of process 200, point of interest determination module 304 can perform the point of interest determination sub-process of process 200, zone determination module 306 can perform the zone determination sub-process of process 200, zone distance determination module 308 can perform calculation of distances between points of interests and zones as described with respect to process 200, and structured data module 310 can perform some or all of the data collection and analysis sub-process as described with respect to process 200.

As illustrated in FIG. 3, each module can interface with user interface module 320. User interface module 320 represents software or hardware (or both) configured to receive user input or provide output (e.g., for user perception, such as via a display device). For example, each module can receive user input received via user interface module 320, can output data via user interface module 320, or both. For example, point of interest determination module 304 can receive user input selection of points of interest on a digital map, or cause display of representations of determined points of interest via a display (e.g., for approval). In some implementations, one or more of the modules in FIG. 3 do not interface with user interface module 320 (for input, for output, or both).

As illustrated in FIG. 3, each module can interface with database 330. Database 330 represents software or hardware (or both) configured to store data (e.g., structured data, tables, attribute data, digital maps, visual overlays, or other data). For example, each module can access data stored in database 330, each module can store (or modify) data in database 330, or both. For example, structured data module 310 can maintain structured data that is stored in database 330, which includes creating and storing new tables, accessing existing tables, and updating stored data. In some implementations, one or more of the modules in FIG. 3 do not interface with database 330 (for accessing data, for storing data, or both).

Figure 4:
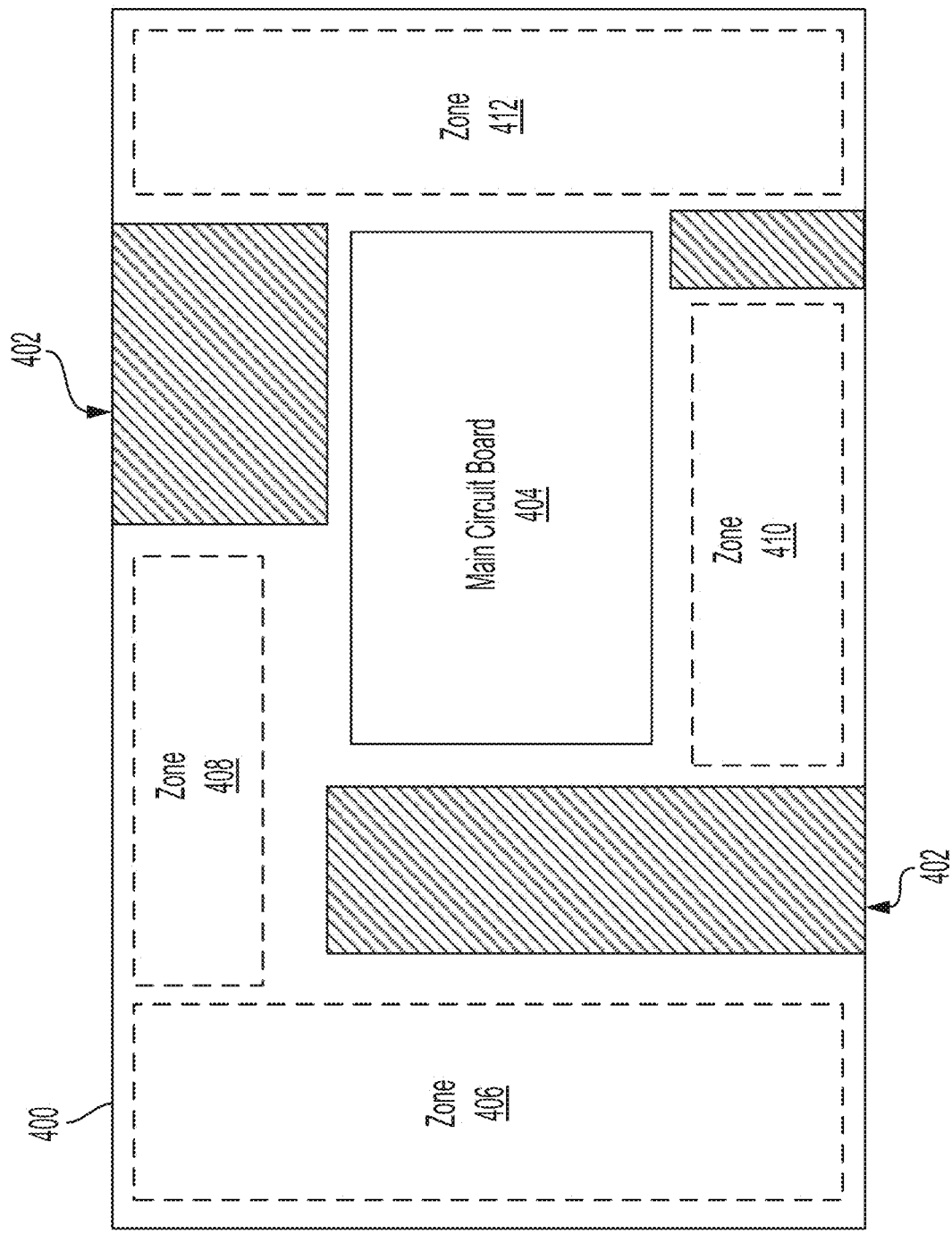
FIG. 4 illustrates a block diagram of an example physical system.

FIG. 4 illustrates a block diagram of an example physical system. Block diagram 400 is a topographical representation of a device footprint. In this example, the device footprint represents an area inside of a device that houses components of the device. As illustrated in FIG. 4, the area includes a main circuit board area 404 and unavailable areas 402 (e.g., which are unavailable for component placement). For example, a digital map of diagram 400 can be used to assist layout, positioning, or both, of additional circuitry, components, or wiring for placement (or routing) within the device footprint. For example, additional circuitry and components can include one or more of any one or more of the following non-limiting examples: motors, motor controllers, telemetry boards, antennae, connectors, ports, power supply components, filters, lights, buttons, wires or wire bundles, buses, heat sinks, fans, or other components. These different types of components or circuitry can involve attributes-either attributes created by operation or attributes needed during operation. For example, motors may generate electromagnetic noise during operation. As another example, the circuitry of a telemetry board may be sensitive to noise. An ideal layout of components within the device footprint can maximize distance between those components, while minimizing distance between the telemetry board and the main circuit board 404 (e.g., to reduce latency). As another example, a components that generates excessive heat can be placed as far from sensitive or critical electronics (e.g., of the main circuit board) but as close as possible to a heat extraction port (e.g., which may be one of the unavailable areas 402). In some implementations, the techniques described herein can be used to optimize placement of components within a defined physical space to address or optimize attributes of the space. For example, attributes of the physical space and components can be used to do so. For instance, a full or partial layout with assigned attributes can be processed and subject to a ranked output.

As shown in FIG. 4, a partial layout that includes fixed placement of main circuit board 404 forms a digital map that includes depictions or representations of the outer border of diagram 400, unavailable areas 402, and main circuit board area 404. Processing of the partial layout of FIG. 4 can result in identification and ranking of zones available for components (e.g., zone 406, zone 408, zone 410, and zone 412) based on identified points of interest (e.g., main circuit board area 404 and unavailable areas 402). The zones illustrated in FIG. 4 can be ranked according to their attributes for a potential use, such as proximity to certain features (e.g., identified as points of interest) represented by the map (e.g., represented by or within unavailable areas 402 or main circuit board 404). Processes in accordance with the techniques herein can be iterative or dynamic. For example, attributes (e.g., in the form of structured data) for components (e.g., 402 or 404) or portions of the digital map can be updated, or the digital map itself may be changed (e.g., main circuit board 404 moved).

While the example described with respect to diagram 400 is an internal footprint of device components, it could also represent a different physical space. For instance, in a different example, diagram 400 (or another diagram) could represent a circuit board with certain components already placed (e.g., a processor and memory), and the remaining areas (e.g., zones 406, 408, 410, and 412) represent areas to place components within the circuit board. As another example, diagram 400 (or another diagram) could represent a building footprint and that includes different services (e.g., utilities) (e.g., at 402 or 404) that need to be distributed to areas (e.g., zones 406, 408, 410, and 412). Other examples are possible, such as those related to the example implementations described here, or others.

Figure 5A:
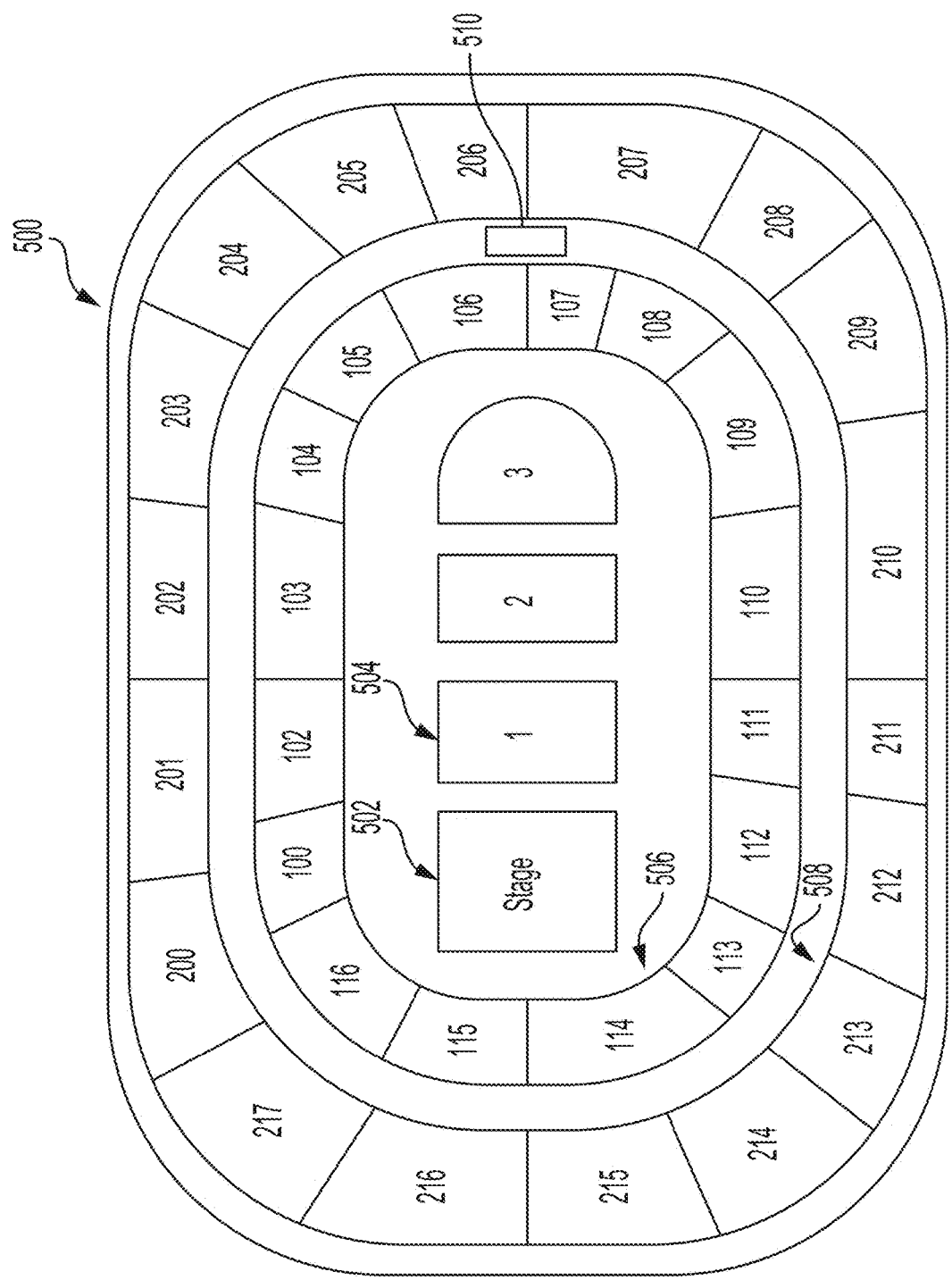
FIGS. 5A-5B illustrate an example digital map used for determining and analyzing structured attribute data for physical systems based on a digital map.
Figure 5B:
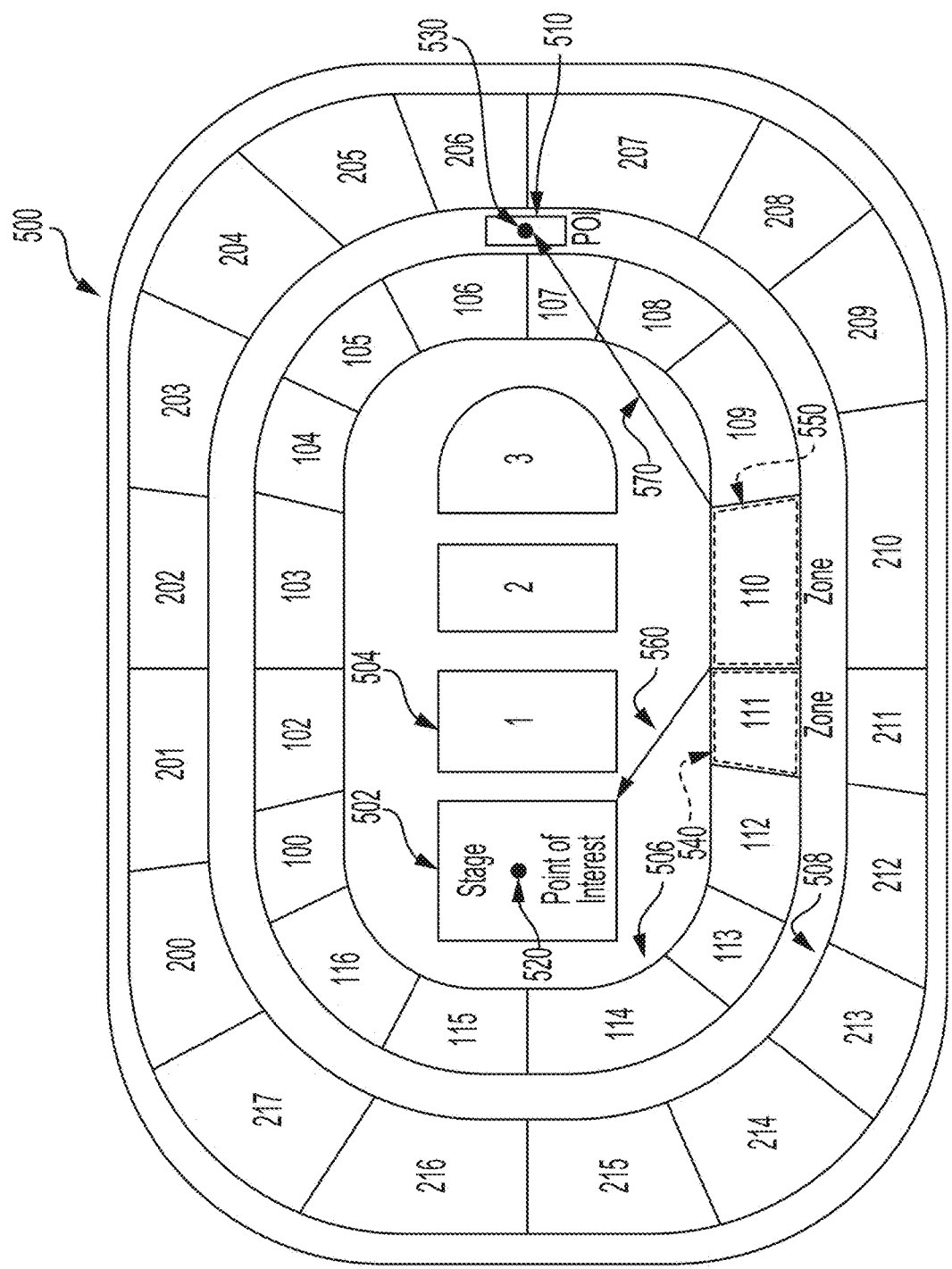

FIGS. 5A-5B illustrate an example digital map. Digital map 500 represents a seat map of an event venue (e.g., an arena). In this example, the digital map depicts a venue configured for a music concert. As illustrated in FIG. 5A, digital map 500 includes stage 502 and door 510 (e.g., for entering and exiting the seating area). Digital map 500 also includes sections representing groups of seats (e.g., floor seat sections in front of the stage 502; a first level of sections with the text labels numbered 100 through 116; a second level of sections with the text labels numbered 200 through 217). For example, section 504 is a floor seat section, section 506 is a first level section, and section 508 is a second level section. In this example, each section includes a number of seats for which event tickets are sold. As illustrated in FIG. 5A, each section outline includes within it a text label representing the section number (e.g., 115, 217, etc.). Digital map 500 can be processed according to the techniques described here to extract attribute data and rank zones according to such attributes.

Turning to FIG. 5B, it illustrates example aspects of information derived from processing digital map 500. For example, as a result of a point of interest determination process, stage 502 and door 510 were identified as points of interest in the digital map. In this example, stage 502 was identified automatically as point of interest 520 due to the text label "stage" determined via optical text recognition and door 510 was specified as a point of interest 530 via user input. For example, as a result of a zone determination process, zone 540 (coterminous with section number 111) and zone 550 (coterminous with section number 110) were identified automatically based on their graphical boundaries and inclusion of section number labels. Further, as illustrated in FIG. 5B, a distance 560 is calculated between zone 550 and stage POI 520 and a distance 570 is calculated between zone 550 and door POI 510. As described elsewhere herein, the distance calculated can be from (or to) an edge of a feature (e.g., of a zone or a point of interest). For example, distance 560 is between an edge of zone 550 and an edge of stage 502 (the basis of point of interest 520); distance 570 is between an edge of zone 550 and point of interest 530 (representing door 510).

In the example illustrated in FIG. 5B, a ranking of zones that evenly weights distance to the stage, distance to the door, and ticket cost may result in zone 550 being ranked highly for the reason that it represents a balance of each of those attributes. A ranking that weights distance to the stage very high (e.g., and weights ticket cost low indicating a willingness to pay higher prices) may result in the floor level set sections being ranked highly.

Figure 6A:
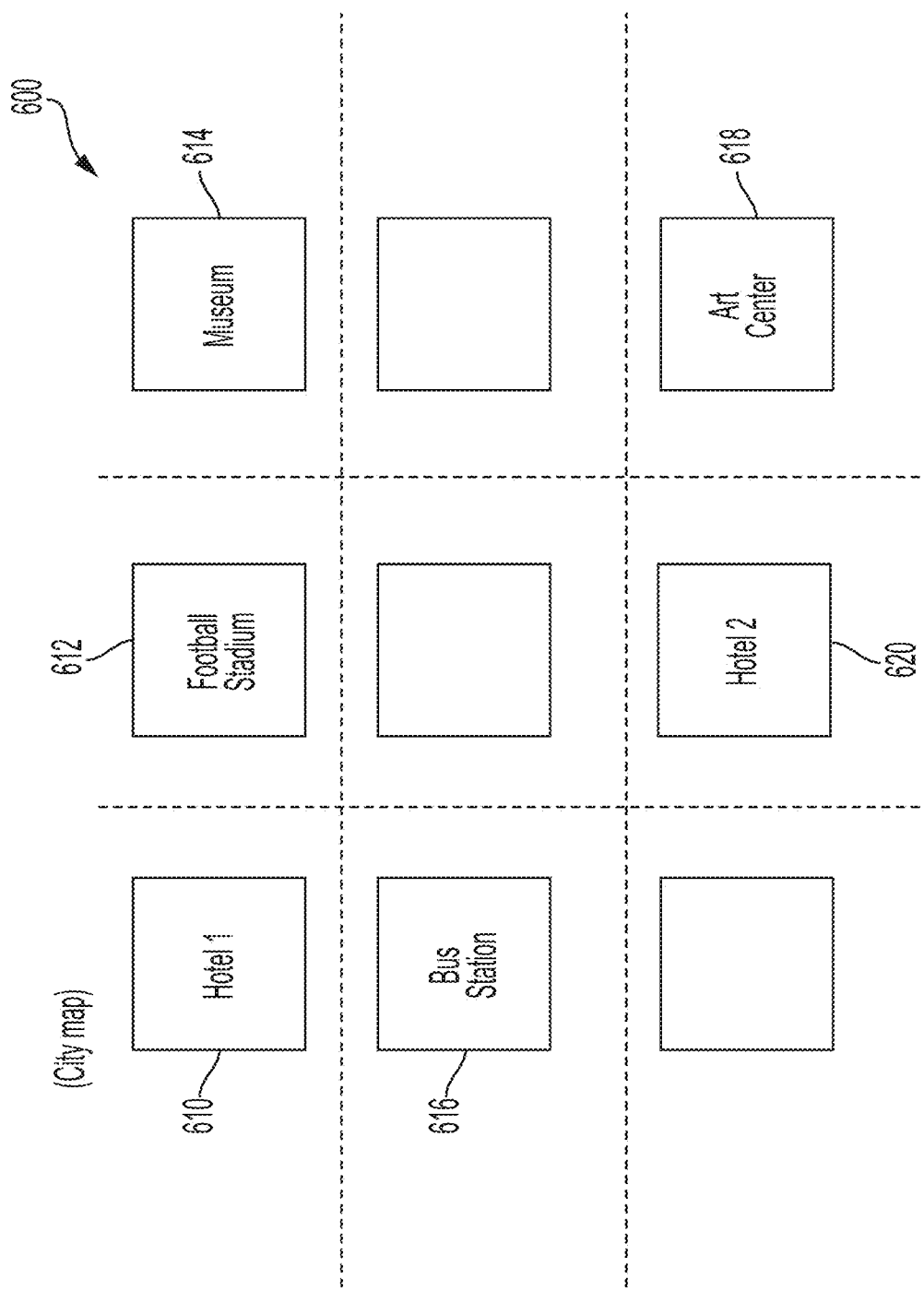
FIGS. 6A-6B illustrate an example digital map used for determining and analyzing structured attribute data for physical systems based on a digital map.
Figure 6B:
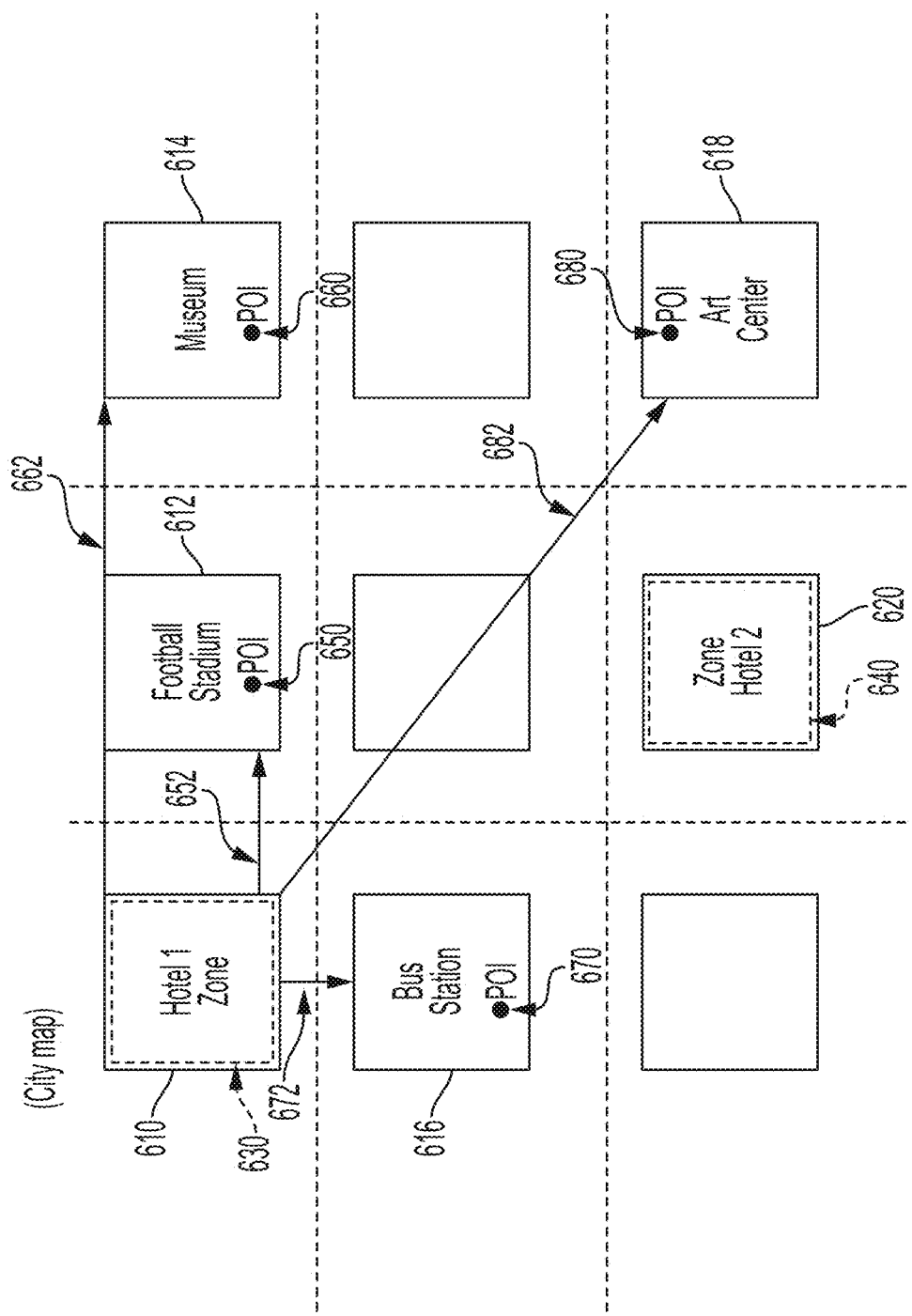

FIGS. 6A-6B illustrate an example digital map. Digital map 600 represents a map of a portion of a city. As illustrated in FIG. 6A, digital map 600 includes hotel 610, football stadium 612, museum 614, bus station 616, art center 618, and hotel 620. Digital map 600 can be processed according to the techniques described here to extract attribute data and rank zones according to such attributes. For example, a potential visitor to the city can be interested in determining an optimal hotel for visiting several points of interest.

Turning to FIG. 6B, it illustrates example aspects of information derived from processing digital map 600. For example, as a result of a point of interest determination process, football stadium 612, museum 614, bus station 616, and art center 618 were identified as points of interest in the digital map. In this example, football stadium 612 was identified automatically as point of interest 650, museum 614 was identified automatically as point of interest 660, bus station 616 was specified as point of interest 670 via user input, and art center 618 was identified automatically as point of interest 680. For example, as a result of a zone determination process, zone 630 (coterminous with hotel 610) and zone 640 (coterminous with hotel 620) were identified automatically based on their graphical boundaries and inclusion of labels identifying them as hotels. Further, as illustrated in FIG. 6B, several distances between zone 630 and points of interests are determined: a distance 652 to point of interest 650, a distance 662 to point of interest 660, a distance 672 to point of interest 670, and a distance 682 to point of interest 680. Similarly, distances from zone 640 to each of the points of interests can be calculated. These distances can be stored in a structured data table, along with other attributes, for the respective zones.

In the example illustrated in FIG. 6B, a ranking of zones that heavily weights distance to football stadium 612 may result in zone 630 being ranked highly for the reason that it is closest to the stadium (e.g., as compared to zone 640). A ranking that evenly weights distance to football stadium 612 and art center 618 may result in zone 640 being ranked highly because it is closer to both of these POIs as compared to zone 630.

In some implementations, the techniques described here can be used to determine demand for tickets for an event. For example, using a digital map of the event's venue and potentially additional attribute data about the venue, a user can determine desirability of certain areas (e.g., seats or sections) based on proximity to one or more POIs within the event (e.g., amenities, stages, attractions, etc.), cost, or other zone attributes (individually or as a weighted combination). In some implementations, an analysis of demand (e.g., a ranking) can be used to assign prices to tickets (e.g., to seats or zones). In some implementations, prices can be determined based on weighted attributes (e.g., a composite price is determined in similar manner to the composite ranking described above, where different attributes can affect price depending on how they are weighted, and a higher ranking zone results in a higher price).

Figure 7:
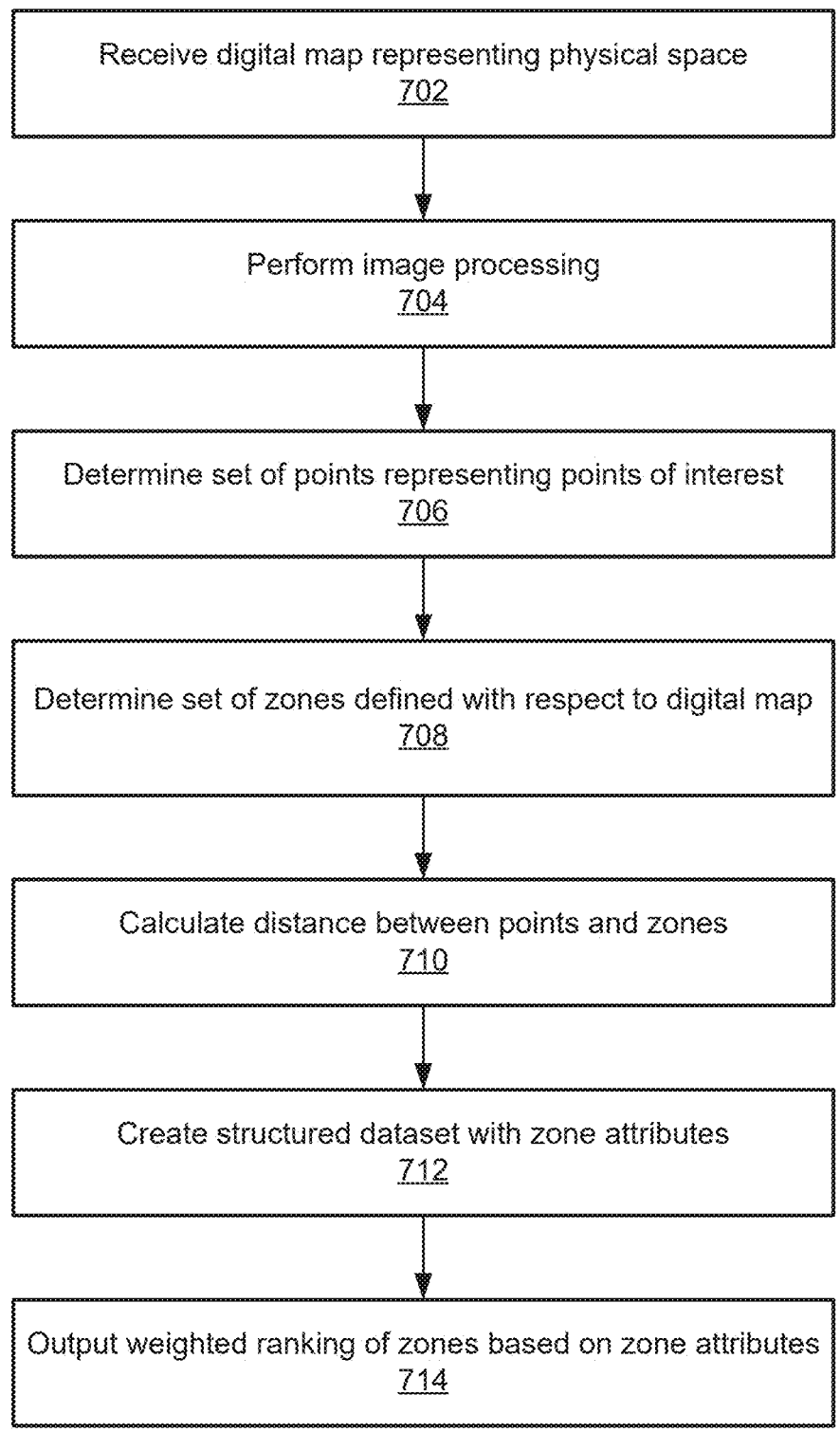
FIG. 7 illustrates a flowchart of an example process for extracting determining and analyzing structured attribute data for physical systems based on a digital map.

FIG. 7 illustrates a flowchart of an example process for extracting and ranking attribute data. Process 700 of FIG. 7 can be performed by one or more computer system (e.g., 800). At 702, a digital map representing a physical system is received. At 704, image processing is preformed using the digital map. At 706, a set of points representing points of interest is determined (e.g., received via user input, retrieved from storage, automatically detected, or a combination of any number of the preceding). At 708, a set of zones defined with respect to the digital map is determined (e.g., defined via criteria or boundaries received via user input, retrieved from storage, automatically detected, or a combination of any number of the preceding). At 710, distance is determined between points in the set of points and zones in the set of zones. At 712, a structured dataset with zone attributes is created. In some implementations, the structured dataset is updated (e.g., is an existing dataset that is accessed and updated). At 714, a ranking of zones based on zone attributes is output.

Note that in the example of process 700, the blocks can be performed in different orders than illustrated or described here, can be combined, some blocks can be omitted, and additional blocks can be performed. Such variations are considered within the scope of this disclosure.

Figure 8:
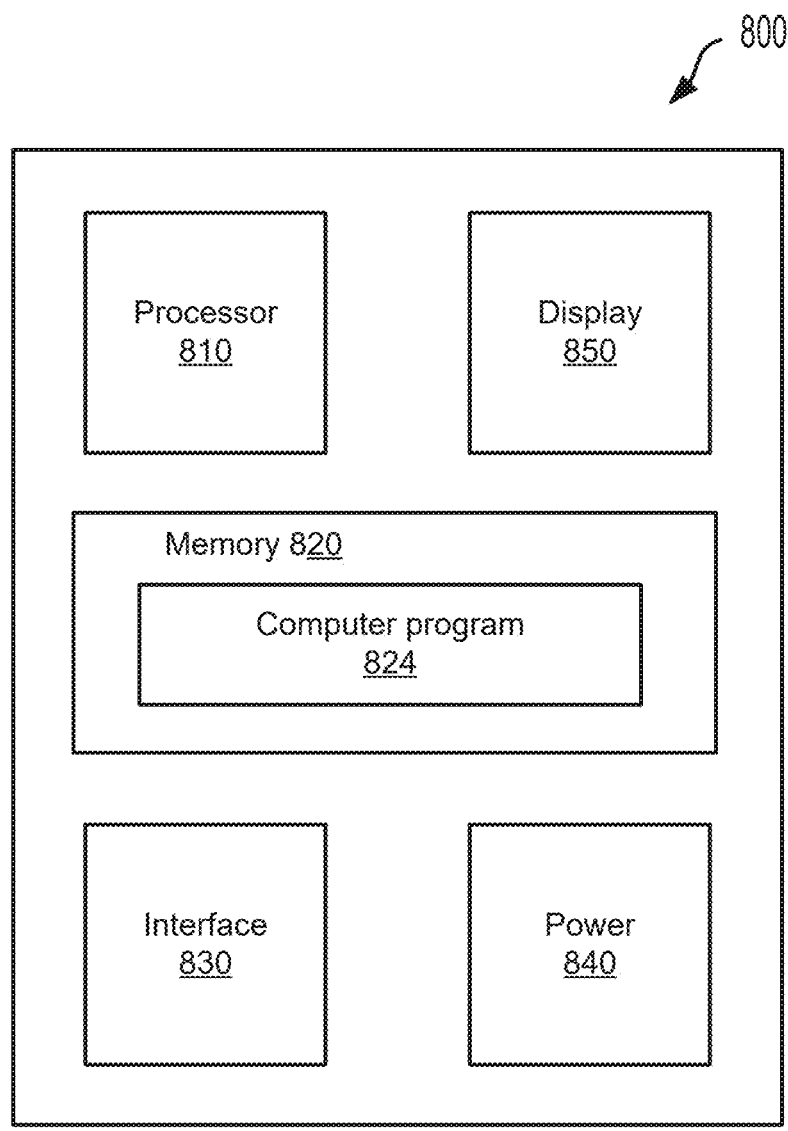
FIG. 8 illustrates a block diagram showing an example computer system in accordance with some embodiments.

FIG. 8 illustrates a block diagram showing an example device in accordance with some embodiments. FIG. 8 is a block diagram showing an example computer system 800 that includes a data processing apparatus and one or more computer-readable storage devices. Computer system 800 can also be referred to as a computing system or device. The term "data-processing apparatus" encompasses all kinds of apparatus, devices, nodes, and machines for processing data, including by way of example, a programmable processor, a computer, a system on a chip, or multiple ones, or combinations, of the foregoing, e.g., processor 810. The apparatus can include special-purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a crossplatform runtime environment, a virtual machine, or a combination of one or more of them.

A computer program (also known as a program, software, software application, script, or code), e.g., computer program 824, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors, e.g., processor 810, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both, e.g., memory 820. Elements of a computer can include a processor that performs actions in accordance with instructions, and one or more memory devices that store the instructions and data. A computer may also include or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media, and memory devices, including by way of example, semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

The example power unit 840 provides power to the other components of the computer system 800. For example, the other components may operate based on electrical power provided by the power unit 840 through a voltage bus or other connection. In some implementations, the power unit 840 includes a battery or a battery system, for example, a rechargeable battery. In some implementations, the power unit 840 includes an adapter (e.g., an AC adapter) that receives an external power signal (from an external source) and converts the external power signal to an internal power signal conditioned for a component of the computer system 800. The power unit 840 may include other components or operate in another manner.

To provide for interaction with a user, operations can be implemented on a computer having one or more display device, e.g., display 850, (e.g., a monitor, a touchscreen, or another type of display device) for displaying information to the user and one or more input device (e.g., a keyboard, a pointing device, a mouse, a trackball, a tablet, a touch sensitive surface or screen, a camera, a sensor, a microphone, or another type of input device) by which the user can provide input to the computer. Other kinds of devices can be used to provide interaction with a user as well. In some cases, computer system 800 includes one or more output device (e.g., a display device, a speaker, a vibration motor, or other output device) that provides feedback for user perception, wherein such feedback can be any form of sensory feedback, e.g., visual feedback, auditory feedback, or tactile feedback. In some cases, user input can be received in any form, including visual, acoustic, speech, or tactile input. In addition, a computer can interact with a user by sending documents to, and receiving documents from, a device that is used by the user; for example, by sending web pages to a web browser on a user's client device in response to requests received from the web browser, or by sending data to an application on a user's client device in response to requests received from the application.

The computer system 800 may include a single computing device or multiple computers that operate in proximity or generally remote from each other and typically interact through a communication network, e.g., via interface 830. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship between client and server may arise by virtue of computer programs running on the respective computers and having a client-server relationship with each other.

The example interface 830 may provide communication with other systems or devices. In some cases, the interface 830 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 830 includes a wired communication interface (e.g., USB, Ethernet) that can be connected to one or more input/output devices, such as, for example, a keyboard, a pointing device, a scanner, or a networking device such as a switch or router, for example, through a network adapter. In some implementations, interface 830 includes, or interfaces with, one or more input devices or output devices (e.g., that receive user input or provide output of feedback for user perception).

In a general aspect, one or more computer systems are used to determine and analyze structured attribute data for physical systems based on a digital map.

In a first example, a method performed at a system (e.g., 800) that includes one or more processors and memory, includes: receiving a digital map representing a physical system; performing a set of image processing operations using the digital map as input, the operations including: performing shape detection of features represented in the digital map; and performing optical character recognition of detected text labels represented in the digital map; determining a set of points defined with respect to the digital map, the set of points representing points of interest within the physical system; determining a set of zones defined with respect to the digital map, the set of zones determined based on: output of the set of image processing operations; and zoning boundaries, zoning criteria, or both; calculating distances (e.g., relative positions or separation) between points in the set of points and zones in the set of zones; creating (or accessing, retrieving, or updating) a structured dataset that includes entries for each zone in the set of zones, wherein each entry includes zone attributes corresponding to a respective zone in the set of zones, the zone attributes including attributes determined based on: output of the set of image processing operations; and one or more of the distances between points in the set of points and the respective zone; determining a ranking of the entries of the structured dataset based on a set of weights corresponding to zone attributes of the structured dataset; and outputting a representation of the determined ranking of the entries of the structured dataset.

Implementations of the first example may include one or more of the following features. The zone attributes include additional attributes, and creating the structured dataset includes retrieving the additional attributes from an external data source. The zone attributes include: a zone identifier for the respective zone, one or more labels associated with the respective zone, one or more location coordinates of the respective zone, the one or more distances between points in the set of points and the respective zone, or a combination of one or more of the above. The one or more calculated between points in the set of points and the respective zone include: a distance between a respective point and the center of the respective zone, a distance between a respective point and an edge of the respective zone, a distance between a respective point and a feature (e.g., edge, point, or shape) of the respective zone, or a combination of one or more of the above. Receiving the set of weights specified by user input. Determining the set of points defined with respect to the digital map includes determining the set of points based on features (e.g., edges, points, or shapes) represented in the digital map. Determining the set of points defined with respect to the digital map includes receiving the set of points specified by user input. Receiving the zoning boundaries, the zoning criteria, or both specified by user input. The set of zones includes one or more zones corresponding to a feature represented in the digital map detected by the set of image processing operations. Outputting the representation of the determined ranking includes: outputting a visual representation of the structured dataset, outputting a visually-modified representation of the digital map, storing the structured dataset, or a combination of one or more of the above. The digital map is a first digital map, the method comprising: receiving a second digital map (e.g., same or different than the first digital map) representing a physical system (e.g., the same or different physical system represented by the first digital map); determining that the second digital map corresponds to an existing structured dataset (e.g., structured dataset created for the first digital map); determining a ranking of entries of the existing structured dataset based on a set of weights corresponding to zone attributes of the existing structured dataset; and outputting a representation of the determined ranking of entries of the existing structured dataset. Determining that the second digital map has changed since a time associated with the existing structured dataset (e.g., the time corresponding to the most recent time the second digital map (or a previous version thereof) was processed for determining attributes); processing the second digital map to determine one or more updated zone attributes; and prior to determining the ranking of entries of the existing structured dataset, updating the existing structured dataset based on the one or more updated zone attributes.

In a second example, a method performed at a system (e.g., 800) that includes one or more processors and memory, includes: receiving a digital map representing a physical system; determining output of a set of image processing operations, including: in accordance with a determination that the digital map is not associated with existing output of the set of image processing operations or that existing output does not satisfy a first set of reuse criteria, performing the set of image processing operations using the digital map as input, the operations including: performing shape detection of features represented in the digital map; and performing optical character recognition of detected text labels represented in the digital map; determining a set of points defined with respect to the digital map, the set of points representing points of interest within the physical system, including: in accordance with a determination that the digital map is not associated with an existing set of points or that the existing set of points does not satisfy a second set of reuse criteria, determining a new set of points defined with respect to the digital map representing points of interest within the physical system; determining a set of zones defined with respect to the digital map, including: in accordance with a determination that the digital map is not associated with an existing set of zones or that the existing set of zones does not satisfy a third set of reuse criteria, determining a new set of zones defined with respect to the digital map, the new set of zones determined based on: the output of the set of image processing operations; and zoning boundaries, zoning criteria, or both; determining distances between points in the set of points and zones in the set of zones; accessing (e.g., creating, retrieving, or updating) a structured dataset that includes entries for each zone in the set of zones, wherein each entry includes zone attributes corresponding to a respective zone in the set of zones, the zone attributes including attributes determined based on: the output of the set of image processing operations; and one or more of the distances between points in the set of points and the respective zone; determining a ranking of the entries of the structured dataset based on a set of weights corresponding to zone attributes of the structured dataset; and outputting a representation of the determined ranking of the entries of the structured dataset.

Implementations of the second example may include one or more of the following features. The existing output of the set of image processing operations does not satisfy the first set of reuse criteria in accordance with a determination that the digital map has changed since a time associated with the existing output. The existing set of points does not satisfy the second set of reuse criteria in accordance with a determination that user input corresponding to selection of a new set of points is received. The existing set of zones does not satisfy the third set of reuse criteria in accordance with a determination that the existing set of zones should be updated (e.g., based on user input received, automatic determination that zones should be updated based on changes to the digital map, or both). The one or more distances between points in the set of points and the respective zone include: a distance between a respective point and the center of the respective zone, a distance between a respective point and an edge of the respective zone, a distance between a respective point and a feature of the respective zone, or a combination of one or more of the above. Determining the new set of points defined with respect to the digital map includes determining the new set of points based on features represented in the digital map. The set of zones includes one or more zones corresponding to a feature represented in the digital map detected by the set of image processing operations. Outputting the representation of the determined ranking includes: outputting a visual representation of the structured dataset (e.g., as a table), outputting a visually-modified representation of the digital map, storing the structured dataset, or a combination of one or more of the above.

In a third example, a system (e.g., 800) comprises one or more processors, and a computer-readable medium storing instructions that are operable when executed by the one or more processors to perform one or more operations of the first example or the second example.

In a fourth example, a non-transitory computer-readable medium storing instructions that are operable when executed by a data processing apparatus (e.g., of 800) to perform one or more operations of the first example, the second example, or the third example.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method, comprising:
    at a system that includes one or more processors and memory:
        receiving a digital map representing a physical system;
        determining output of a set of image processing operations, including:
            in accordance with a determination that the digital map is not associated with existing output of the set of image processing operations or that existing output does not satisfy a first set of reuse criteria, performing the set of image processing operations using the digital map as input, the operations including:
                performing shape detection of features represented in the digital map; and
                performing optical character recognition of detected text labels represented in the digital map;
        determining a set of points defined with respect to the digital map, the set of points representing points of interest within the physical system, including:
            in accordance with a determination that the digital map is not associated with an existing set of points or that the existing set of points does not satisfy a second set of reuse criteria, determining a new set of points defined with respect to the digital map representing points of interest within the physical system;
        determining a set of zones defined with respect to the digital map, including:
            in accordance with a determination that the digital map is not associated with an existing set of zones or that the existing set of zones does not satisfy a third set of reuse criteria, determining a new set of zones defined with respect to the digital map, the set of zones determined based on:
                output of the set of image processing operations; and
                zoning boundaries, zoning criteria, or both;
        calculating distances between points in the set of points and zones in the set of zones;
        creating a structured dataset that includes entries for each zone in the set of zones, wherein each entry includes zone attributes corresponding to a respective zone in the set of zones, the zone attributes including attributes determined based on:
            output of the set of image processing operations; and
            one or more of the distances between points in the set of points and the respective zone;
        determining a ranking of the entries of the structured dataset based on a set of weights corresponding to zone attributes of the structured dataset; and
        outputting a representation of the determined ranking of the entries of the structured dataset.

2. The method of claim 1, wherein the zone attributes include additional attributes, and wherein creating the structured dataset includes retrieving the additional attributes from an external data source.

3. The method of claim 1, wherein the zone attributes include:

a zone identifier for the respective zone,
one or more labels associated with the respective zone,
one or more location coordinates of the respective zone,
the one or more distances between points in the set of points and the respective zone, or
a combination of one or more of the above.

4. The method of claim 1, wherein the one or more distances between points in the set of points and the respective zone include:
a distance between a respective point and the center of the respective zone,
a distance between a respective point and an edge of the respective zone,
a distance between a respective point and a feature of the respective zone, or
a combination of one or more of the above.

5. The method of claim 1, comprising:
receiving the set of weights specified by user input.

6. The method of claim 1, wherein determining the set of points defined with respect to the digital map includes determining the set of points based on features represented in the digital map.

7. The method of claim 1, wherein determining the set of points defined with respect to the digital map includes receiving the set of points specified by user input.

8. The method of claim 1, comprising:
receiving the zoning boundaries, the zoning criteria, or both specified by user input.

9. The method of claim 1, wherein the set of zones includes one or more zones corresponding to a feature represented in the digital map detected by the set of image processing operations.

10. The method of claim 1, wherein outputting the representation of the determined ranking includes:
outputting a visual representation of the structured dataset,
outputting a visually-modified representation of the digital map,
storing the structured dataset, or
a combination of one or more of the above.

11. The method of claim 1, wherein the digital map is a first digital map, the method comprising:
receiving a second digital map representing a physical system;
determining that the second digital map corresponds to an existing structured dataset;
determining a ranking of entries of the existing structured dataset based on a set of weights corresponding to zone attributes of the existing structured dataset; and
outputting a representation of the determined ranking of entries of the existing structured dataset.

12. The method of claim 11, comprising:
determining that the second digital map has changed since a time associated with the existing structured dataset;
processing the second digital map to determine one or more updated zone attributes; and
prior to determining the ranking of entries of the existing structured dataset, updating the existing structured dataset based on the one or more updated zone attributes.

13. A system comprising:
one or more processors; and
a computer-readable medium storing instructions that are operable when executed by the one or more processors to perform operations comprising:
receiving a digital map representing a physical system;
determining output of a set of image processing operations, including:
in accordance with a determination that the digital map is not associated with existing output of the set of image processing operations or that existing output does not satisfy a first set of reuse criteria, performing the set of image processing operations using the digital map as input, the operations including:
performing shape detection of features represented in the digital map; and
performing optical character recognition of detected text labels represented in the digital map;
determining a set of points defined with respect to the digital map, the set of points representing points of interest within the physical system, including:
in accordance with a determination that the digital map is not associated with an existing set of points or that the existing set of points does not satisfy a second set of reuse criteria, determining a new set of points defined with respect to the digital map representing points of interest within the physical system;
determining a set of zones defined with respect to the digital map, including:
in accordance with a determination that the digital map is not associated with an existing set of zones or that the existing set of zones does not satisfy a third set of reuse criteria, determining a new set of zones defined with respect to the digital map, the new set of zones determined based on:
the output of the set of image processing operations; and
zoning boundaries, zoning criteria, or both;
determining distances between points in the set of points and zones in the set of zones;
accessing a structured dataset that includes entries for each zone in the set of zones, wherein each entry includes zone attributes corresponding to a respective zone in the set of zones, the zone attributes including attributes determined based on:
the output of the set of image processing operations; and
one or more of the distances between points in the set of points and the respective zone;
determining a ranking of the entries of the structured dataset based on a set of weights corresponding to zone attributes of the structured dataset; and
outputting a representation of the determined ranking of the entries of the structured dataset.

14. The system of claim 13, wherein the existing output of the set of image processing operations does not satisfy the first set of reuse criteria in accordance with a determination that the digital map has changed since a time associated with the existing output.

15. The system of claim 13, wherein the existing set of points does not satisfy the second set of reuse criteria in accordance with a determination that user input corresponding to selection of a new set of points is received.

16. The system of claim 13, wherein the existing set of zones does not satisfy the third set of reuse criteria in accordance with a determination that the existing set of zones should be updated.

17. The system of claim 13, wherein the one or more distances between points in the set of points and the respective zone include:

a distance between a respective point and the center of the respective zone, a distance between a respective point and an edge of the respective zone, a distance between a respective point and a feature of the respective zone, or a combination of one or more of the above.

18. The system of claim 13, wherein determining the new set of points defined with respect to the digital map includes determining the new set of points based on features represented in the digital map.

19. The system of claim 13, wherein the set of zones includes one or more zones corresponding to a feature represented in the digital map detected by the set of image processing operations.

20. The system of claim 13, wherein outputting the representation of the determined ranking includes:

outputting a visual representation of the structured dataset, outputting a visually-modified representation of the digital map, storing the structured dataset, or a combination of one or more of the above.

21. A non-transitory computer-readable medium storing instructions that are operable when executed by data processing apparatus to perform operations comprising:

receiving a digital map representing a physical system;

determining output of a set of image processing operations, including:

in accordance with a determination that the digital map is not associated with existing output of the set of image processing operations or that existing output does not satisfy a first set of reuse criteria, performing the set of image processing operations using the digital map as input, the operations including:

performing shape detection of features represented in the digital map; and performing optical character recognition of detected text labels represented in the digital map;

determining a set of points defined with respect to the digital map, the set of points representing points of interest within the physical system, including:

in accordance with a determination that the digital map is not associated with an existing set of points or that the existing set of points does not satisfy a second set of reuse criteria, determining a new set of points defined with respect to the digital map representing points of interest within the physical system;

determining a set of zones defined with respect to the digital map, including:

in accordance with a determination that the digital map is not associated with an existing set of zones or that the existing set of zones does not satisfy a third set of reuse criteria, determining a new set of zones defined with respect to the digital map, the new set of zones determined based on:

the output of the set of image processing operations; and zoning boundaries, zoning criteria, or both;

determining distances between points in the set of points and zones in the set of zones;

accessing a structured dataset that includes entries for each zone in the set of zones, wherein each entry includes zone attributes corresponding to a respective zone in the set of zones, the zone attributes including attributes determined based on:

the output of the set of image processing operations; and one or more of the distances between points in the set of points and the respective zone;

determining a ranking of the entries of the structured dataset based on a set of weights corresponding to zone attributes of the structured dataset; and outputting a representation of the determined ranking of the entries of the structured dataset.

22. The non-transitory computer-readable medium of claim 21, wherein the existing output of the set of image processing operations does not satisfy the first set of reuse criteria in accordance with a determination that the digital map has changed since a time associated with the existing output.

23. The non-transitory computer-readable medium of claim 21, wherein the existing set of points does not satisfy the second set of reuse criteria in accordance with a determination that user input corresponding to selection of a new set of points is received.

24. The non-transitory computer-readable medium of claim 21, wherein the existing set of zones does not satisfy the third set of reuse criteria in accordance with a determination that the existing set of zones should be updated.

25. The non-transitory computer-readable medium of claim 21, wherein the one or more distances calculated between points in the set of points and the respective zone include:

a distance between a respective point and the center of the respective zone, a distance between a respective point and an edge of the respective zone, a distance between a respective point and a feature of the respective zone, or a combination of one or more of the above.

26. The non-transitory computer-readable medium of claim 21, wherein determining the new set of points defined with respect to the digital map includes determining the new set of points based on features represented in the digital map.

27. The non-transitory computer-readable medium of claim 21, wherein the set of zones includes one or more zones corresponding to a feature represented in the digital map detected by the set of image processing operations.

28. The non-transitory computer-readable medium of claim 21, wherein outputting the representation of the determined ranking includes:

outputting a visual representation of the structured dataset, outputting a visually-modified representation of the digital map, storing the structured dataset, or a combination of one or more of the above.

* * * * *